(No Model.)
W. H. BOWEN.
THRASHING MACHINE.
No. 539,338. Patented May 14, 1895.
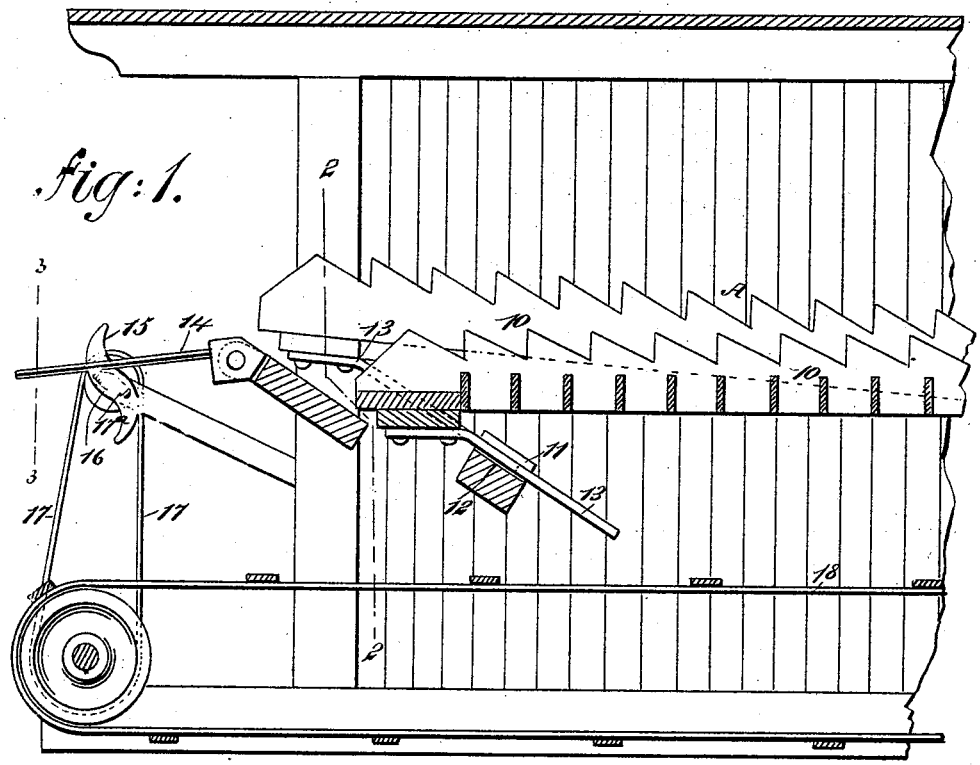
fig: 1.
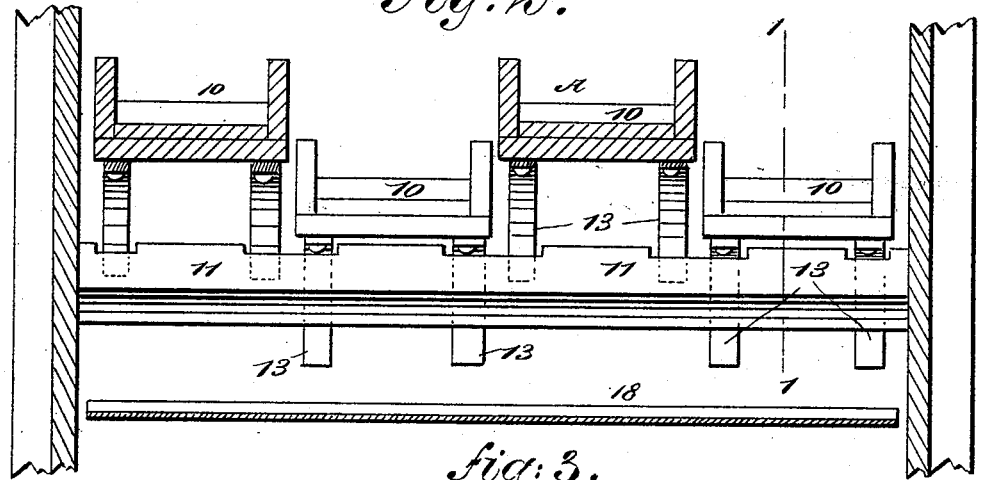
fig: 2.
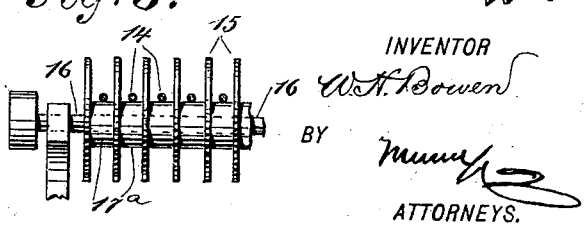
fig: 3.
WITNESSES:
Chas. Niela
J. Fred Ackers
INVENTOR
W. H. Bowen
BY
Munn
ATTORNEYS.
THE NORRIS PETERS CO., PHOTO-LITHO., WASHINGTON, D. C.

UNITED STATES PATENT OFFICE.

WILLIAM H. BOWEN, OF WISE, MICHIGAN.

THRASHING-MACHINE.

SPECIFICATION forming part of Letters Patent No. 539,338, dated May 14, 1895.

Application filed January 8, 1895. Serial No. 534,234. (No model.)

*To all whom it may concern:*

Be it known that I, WILLIAM H. BOWEN, of the township of Wise, county of Isabella, and State of Michigan, have invented a new and Improved Thrashing-Machine, of which the following is a full, clear, and exact description.

My invention relates to an improvement in thrashing machines, and it has for its object to provide for a movement of the straw-discharge fork, the actuating medium of the fork likewise serving to shake the straw and thus discharge any grain clinging thereto.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a partial longitudinal section through the body of the thrashing-machine, the section being taken practically on the line 1 1 of Fig. 2. Fig. 2 is a transverse section taken substantially on the line 2 2 of Fig. 1, and Fig. 3 is a section taken substantially on the line 3 3 of Fig. 1.

In carrying out the invention the straw carrier A consists of a series of longitudinal sections 10, which are of box-like character and are provided with stepped upper surfaces adapted especially for carrying the straw to the delivery end of the machine. The sections are arranged in pairs, and alternate sections move in the same direction. Below each of the said sections and at or near their rear ends a cross bar 11 is secured in the frame of the machine. This cross bar is provided with inclined top and bottom surfaces and with a series of openings 12, extending through it from one side to the other parallel with the top and bottom as shown in Fig. 1, the said openings 12 having a downward and forward inclination.

An arm 13 is secured to the under face of each of the straw-carrying sections 10 at or near their rear ends. These arms extend forwardly and downwardly from the said straw-carrying sections, and each arm is made to enter and is fitted to loosely slide in one of the said openings 12 in the cross bar. Thus it will be observed that when the straw-carrying sections are raised at or near their forward ends, which may be accomplished by any suitable means, they will be guided in an upward and rearward direction by reason of the support of the arms 13 in the said cross bar, and when two alternate sections are in an upper position two other sections will be in a lower position, as illustrated in Fig. 2.

At the delivery end of the machine a fork 14 is pivoted, and this fork is adapted to receive the straw from the carriers 10. The fork is vertically reciprocated through the medium of a series of cams 15, the said cams being preferably S-shaped in general contour, and they are mounted upon a shaft 16 journaled below the tines of the fork; and the said shaft is driven by a suitable belt 17 from any convenient source of power. Each cam is provided with two shoulders 17$^a$ upon one of its side faces, the shoulders being at each side of the center, and as the cams are revolved the shoulders strike the tines of the fork and thereby raise and lower the same. At the same time the points of the cams will extend upward between the tines of the fork and will agitate the same, or toss it up and down in a manner to insure any grain adhering thereto dropping down upon the endless belt 18 usually employed to receive the grain.

Having thus described my invention, I claim as new and desire to secure by Letters Patent—

In a thrashing machine, the combination, with a series of straw-carriers adapted to have a rotary and reciprocating movement, of a fork located near the delivery end of the said carriers, and receiving the straw therefrom, the said fork being pivoted to a fixed support at the rear of the machine, a shaft journaled below the tines of the fork about midway of their length, and S-cams secured upon said shaft, and provided with shoulders at each side of their centers upon one of their faces, the shoulders alternately engaging the tines of the fork to raise the same, while the points of the cams extend upward between the tines and toss the straw carried by the fork, thereby discharging any grain adhering thereto, as and for the purpose specified.

WILLIAM H. BOWEN.

Witnesses:
JOHN GIBERSON,
D. P. MANO.